United States Patent [19]

Bell et al.

[11] 4,356,557

[45] Oct. 26, 1982

[54] WINCH DRUM CABLE LENGTH MEASUREMENT APPARATUS

[75] Inventors: Leo A. Bell, Houston, Tex.; William H. Terbrack, Irvine, Calif.

[73] Assignee: Cooper Industries, Inc., Houston, Tex.

[21] Appl. No.: 79,334

[22] Filed: Sep. 27, 1979

Related U.S. Application Data

[63] Continuation-in-part of Ser. No. 893,874, Apr. 6, 1978, abandoned.

[51] Int. Cl.³ .................... G01B 7/04; G06F 15/46
[52] U.S. Cl. .................................................. 364/562
[58] Field of Search .................... 364/561, 562; 235/92 DN; 73/760, 783, 793, 852; 33/126.5, 126.6, 133, 140, 142

[56] References Cited

U.S. PATENT DOCUMENTS

| | | | |
|---|---|---|---|
| 2,322,478 | 6/1943 | Scherbatskoy | 73/151.5 |
| 2,330,752 | 9/1943 | Sikes, Jr. | 73/151.5 |
| 2,330,753 | 9/1943 | Sikes, Jr. | 73/151.5 |
| 2,539,758 | 1/1951 | Silverman et al. | 73/151.5 |
| 3,076,966 | 2/1963 | Suter et al. | 346/33 R |
| 3,214,762 | 10/1965 | Van Winkle et al. | 346/33 R |
| 3,374,669 | 3/1968 | Redwine | 73/151.5 |
| 3,497,958 | 3/1970 | Gollwitzer | 33/133 |
| 3,510,632 | 5/1970 | Strandberg | 235/92 DN |
| 3,564,219 | 2/1971 | Mutziger | 364/562 |
| 3,663,806 | 5/1972 | Drankhan et al. | 364/560 |
| 3,710,084 | 1/1973 | Slagley et al. | 364/562 |
| 3,747,218 | 7/1973 | Bell | 33/134 A |
| 3,824,694 | 7/1974 | Lesperance et al. | 235/92 DN |
| 3,953,713 | 4/1976 | De Ligt | 235/92 DN |
| 4,052,599 | 10/1977 | Whiteley | 364/562 |
| 4,114,435 | 9/1978 | Patton et al. | 364/562 |

OTHER PUBLICATIONS

ARO Corporation Catalog—"And" Logic Element Model 59111; DIG Logic Model 59114; Flip-Flop Element Mod. 59180; Tim Screw Control Timer Model 59115.

*Primary Examiner*—Errol A. Krass
*Attorney, Agent, or Firm*—Spensley, Horn, Jubas & Lubitz

[57] ABSTRACT

The invention is an electronic wire length measuring apparatus for accurately measuring and indicating the height of a traveling block above a fixed reference point in oil well drilling applications where a traveling block is hooked to a cable and pulley arrangement and to a winch drum, said winch drum being used to vary the height of the traveling block. The wire length measuring apparatus produces an output visual indication of the height of the traveling block independent of variations in drum size, wire size, number of layers on the drum, and the weight load on the traveling block, which causes a lower actual traveling block position due to stretching in the wire.

3 Claims, 6 Drawing Figures

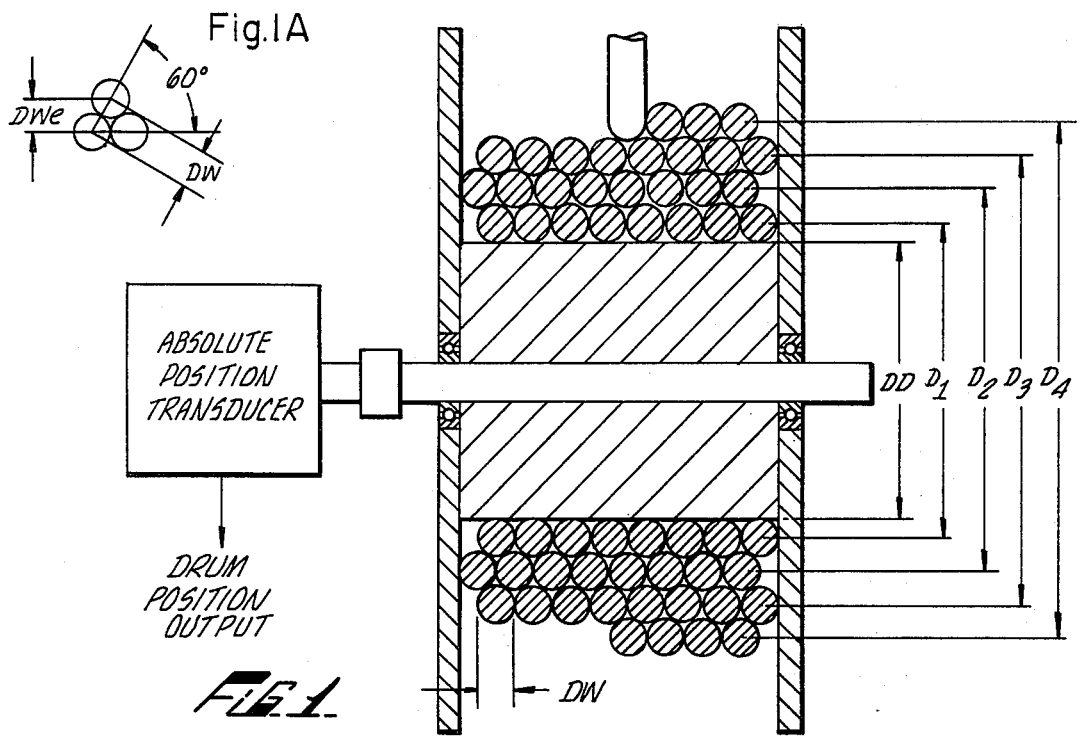
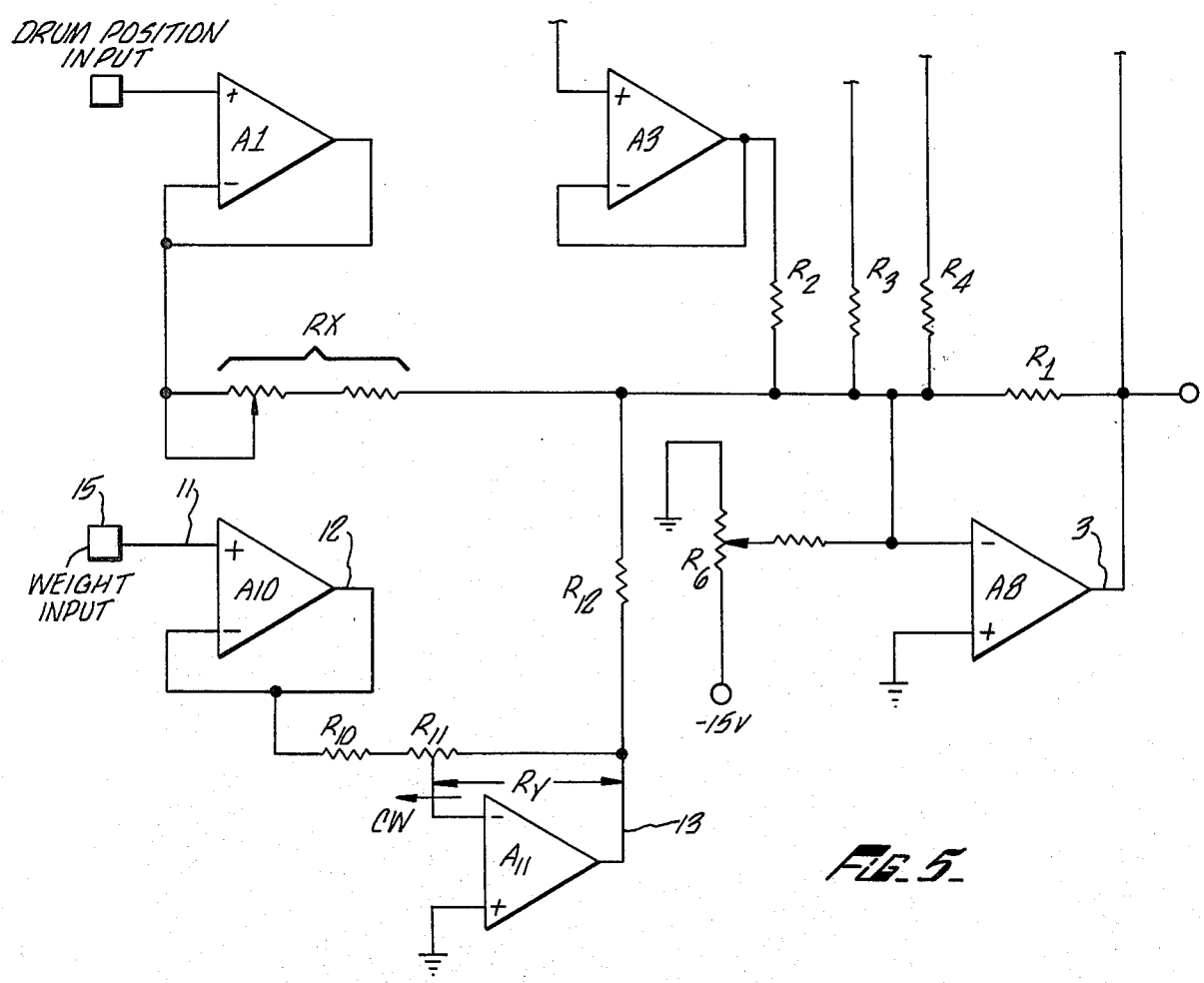

WINCH DRUM CABLE LENGTH MEASUREMENT APPARATUS

RELATED APPLICATON

This application is a continuation-in-part of U.S. patent application Ser. No. 893,874 filed Apr. 6, 1978 and now abandoned.

BACKGROUND OF THE INVENTION

1. Field of the Invention

The invention primarily relates to the oil drilling field where it is important to know the height of a traveling block in a winch drum cable and pulley arrangement, which traveling block is used to hoist drill and pipe out of a hole. The invention also has applications in any winch drum arrangement where it is important to know the amount of wire or cable that has been wrapped onto a drum or payed therefrom.

2. Prior Art

The piror art is replete with various systems that measure the length of wire payed out from a drum or passing over a rotating member. However, none teach the accurate determination of the exact position of a load. The present invention so teaches by way of an accurate calculation of the amount of wire wrapped onto a drum by taking into account the different diameter of each layer of wire.

Two of the most relevant patents in the prior art are Ancheta, U.S. Pat. No. 3,883,859 and Lute, U.S. Pat. No. 3,750,130. Ancheta teaches a system for indicating the position of a load in crane applications where the load cannot be seen. A selsyn generator is mechanically connected to the winch drum. The selsyn generator drives a synchronous motor in unison over mechanical counter. No correction is made for the increased diameter of subsequent layers nor for stretch.

Lute teaches an electrical indicator for load height in crane applications where a cam operated switch is associated with the winch drum. Rotation of the drum closes the switch once each revolution. Lights, bells or other suitable indicators are used to indicate each time the drum rotates. Again no compensation is made for increased layer diameter or stretch.

Jones, U.S. Pat. No. 3,390,574 teaches a ton-mile indicating system for estimating time for replacement of the line. The patent teaches an integrator which continually integrates a signal from a stress transducer attached to the line and a mechanical analog signal for the amount of line wound onto or off from the drum. The two signals are multiplied and converted to a digital readout. No indication of load height is made, nor is there any compensation for different layer diameters and stretch in the line.

Horton, U.S. Pat. No. 3,538,761 teaches a similar ton-mile recorder system wherein the line travel signal and weight signals are hydraulic. Multiplication and integration are hydraulic. Again, no indication of load height is made nor any correction for layer diameter and stretch.

Also, of slight interest are: Westlake, U.S. Pat. No. 3,853,004; Zaleson, U.S. Pat. No. 3,934,126; Suzuki, U.S. Pat. No. 4,012,918; Wells, U.S. Pat. No. 2,061,863; Green, U. S. Pat. No. 3,017,770; Silverman U.S. Pat. Nos. 2,539,785 and 2,365,014.

SUMMARY OF THE INVENTION

The invention in its preferred embodiment comprises analog circuitry to incorporate various equations which indicate the relationship between the length of wire wrapped onto a drum, the drum size, wire size, and the number of layers.

An embodiment uses digital circuitry to store the various fixed parameters and to make suitable calculations incorporating the fixed parameters as well as the output of two transducers indicating the angular position of the drum and the stress on the line. The resultant digital data representing the actual traveling block position is then displayed on a visual display.

It is the principal object of this invention to allow an operator of a winch drum hoist on an oil derrick to know at all times the actual position of the traveling block regardless of the number of layers of wire, size of wire, the drum size, the amount of pipe, and the resulting weight load on the traveling block.

It is another object of this invention to allow computation of the rate of penetration of the hole by differentiating the traveling block position signal per unit time.

It is another object of this invention to allow computation of an oil well hole depth.

It is another object of this invention to allow the operator to know when the traveling block position is between predetermined minimums and maximums.

It is another object of this invention to allow computation of traveling block speed when additional pipe is being raised or lowered into the hole or when the drill pipe is being withdrawn from the hole, it being necessary to know the speed because of set limitations on withdrawal speed from various geological formations of earth.

BRIEF DESCRIPTION OF THE DRAWINGS

FIG. 1 is a sectional view of a winch drum wrapped with multiple layers of wire and the various geometric relationship between drum diameter, wire diameter, diameter of the center line of the first layer, diameter of the center line of the second layer, the relationship of the diameter of the center line of one layer to the diameter of the center line of the second layer.

FIG. 1A is a sectional view showing the relationship between wires in adjacent layers.

FIG. 5 is a schematic diagram of the analog circuitry which corrects the output display indication of the actual traveling block position when more weight is placed upon the traveling block causing stretch in the wire.

DETAILED DESCRIPTION OF PREFERRED EMBODIMENT

Figure 2:
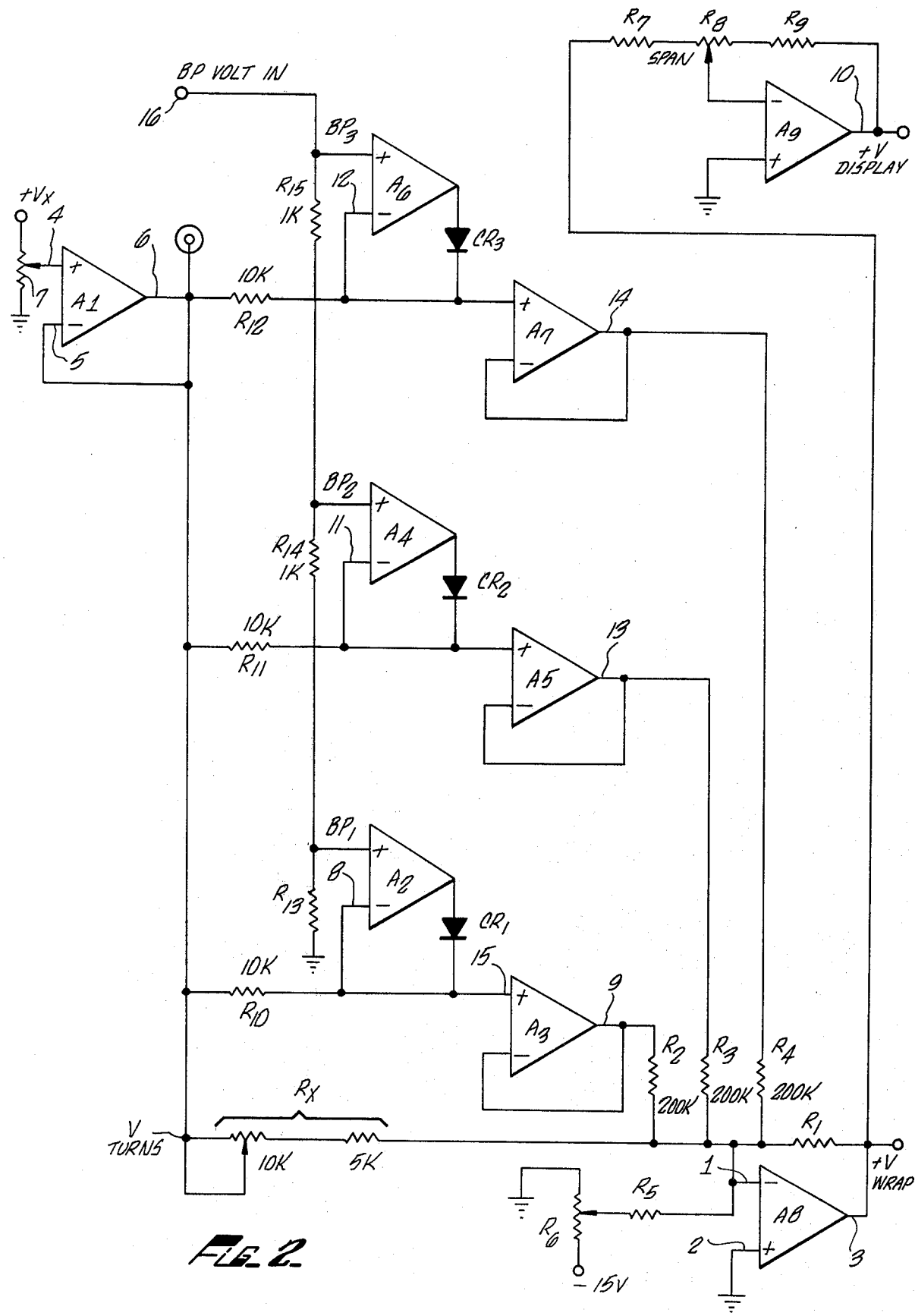
FIG. 2 is a schematic diagram of the analog circuitry which calculates the actual location of the traveling block using the output signal of an absolute angular drum position transducer mechanically connected to the winch drum. A digital or analog voltmeter measuring the analog voltage at the output of this circuit can be calibrated to indicate suitable engineering units.

Referring now to FIG. 1, it is apparent that $D_1$ differs from DD by the wire diameter DW. Likewise, the difference between $D_1$ and $D_2$ equals 2DWE which equals 2DW sine 60° because of the geometry of the equilateral triangle formed by the three points defined by the centers of the three wires in adjacent layers shown in FIG. 1A. The relationships between the wire diameter, the drum diameter and the diameters of the circles defined by the centerlines of the wires in each layer are:

---
(1) DW = Diameter of the wire
(2) DWE = DW sine 60° = a constant K
(3) DD = Drum diameter
(4) $D_1$ = DD + DW
(5) $D_2$ = $D_1$ + 2DWE
(6) $D_3$ = $D_2$ + 2DWE
.
.
--- etc. for as many layers as are wrapped on the drum.

From these relationships, it is easily seen that the amount of wire wound onto a drum is:

$$L = N_1\pi D_1 + N_2\pi D_2 + N_3\pi D_3 + N_J\pi D_J \qquad (7)$$

where
L = length of wire wrapped onto the drum and

---
$N_1$ = the number of turns in layer 1
$N_2$ = the number of turns in layer 2
.
.
--- etc., for as many layers as are present.

Further, it can be seen that the relationship of $D_2$ in FIG. 1 to $D_1$ and DEW is:

$$D_2 = D_1 + 2\ DWE = D_1 + 2K, \qquad (8)$$

Likewise, $$D_3 = D_1 + 4\ DWE = D_1 + 4K, \qquad (9)$$

and $$D_4 = D_1 + 6\ DWE = D_1 + 6K. \qquad (10)$$

Therefore, $$L = N_1\pi D_1 + N_2\pi(D_1 + 2K) + N_3\pi(D_1 + 4k) + \ldots \qquad (11)$$

Equation (11) shows the total length of wire wrapped on the drum is equal to the sum of the number of turns wrapped in each layer, each multiplied by a different constant term.

Equation (11) is incorporated by the preferred embodiment analog circuit shown in FIG. 2. There, a drum motion transducer 7 in the form of a potentiometer converts the absolute angular position of a drum into an output voltage at point 4 between 0 and positive $V_x$ volts.

Isolation amplifier A1 is an operational difference amplifier with positive and negative inputs as are all other amplifiers in the circuit of FIG. 2. Amplifier A1 is connected as a voltage follower of unity gain with a high input impedance so as to isolate drum motion transducer 7 yet substantially reproduce the voltage at 4 at 6 as a turn signal representing the absolute angular position of the drum from some reference point. The turn signal varies from 0 to $+V_x$ volts.

Second, third and fourth, etc. layer input means are comprised of amplifiers A2, A3, A4, A5, A6 and A7. The purpose of these circuits is to sense the turns signal valve and compare it to a fixed breakpoint voltage (BP) for each layer at points $BP_1$, $BP_2$, $BP_3$ ... etc. in FIG. 2. The voltage at points $BP_1$, $BP_2$, $BP_3$, etc. represent predetermined breakpoint voltages such that when the turns signal voltage reaches the value indicating a new layer is being wrapped e.g., 2d layer, the voltage at point $BP_1$, i.e., the second layer breakpoint voltage wll just equal the turns signal voltage. When the turns signal exceeds one of these fixed voltage references, a new layer with a new diameter is being wrapped onto the drum, and that particular layer's circuit "turns on" which effectively places its particular output resistor ($R_2$, $R_3$ or $R_4$) in parallel with $R_x$. This changes the gain of amplifier A8, which gain is equal to the ratio of the resistance of $R_1$ divided by the resistance seen from point 1 to point 6. The changed gain in A8 is necessary to incorporate the new constant for the term in equation (11) representing the length of turns on the particular layer in question.

When the turns signal is less than $BP_1$, only the first layer is being wrapped, and only the first layer input means $R_x$ is seen between point 1 and 6. In this case, the gain of inverting operational amplifier A8 equals $R_1/R_x$. $R_x$ is made variable so that the gain of A8 may be made proportional to $\pi D_1$ in equation (11). Gain in this context is the ratio $V_{wrap}/V_{turns}$. (point 3 voltage/point 6 voltage).

With $V_{turns}$ less than $BP_1$, diodes $CR_1$, $CR_2$, and $CR_3$ are conducting and amplifiers $A_2$, $A_4$, and $A_6$ ... are in the active region. The nature of these difference amplifiers is such that in the active state, the diodes will keep points 8, 11, and 12 ... at voltages $BP_1$, $BP_2$, $BP_3$ ... respectively. Amplifiers $A_3$, $A_5$, and $A_7$ are connected as voltage followers of unity gain with high input impedances. Diodes $CR_1$, $CR_2$ and $CR_3$ ... act as current sumps for whatever currents are flowing in resistors $R_{10}$, $R_{11}$, and $R_{12}$, etc. due to the differences in voltage between $BP_1$, $BP_2$, $BP_3$, etc. and $V_{turns}$. Since voltages at points 8, 11, and 12, etc. are held at $BP_1$, $BP_2$ and $BP_3$ respectively, when $V_{turns}$ is less than $BP_1$, the voltages at points 9, 13, and 14, etc. are equal to $BP_1$, $BP_2$, and $BP_3$ etc. These voltages respectively remain constant till $V_{turns\ exceeds\ BP_1}$, $BP_2$, etc. respectively. The constant bias currents thus set up in resistors $R_2$, $R_3$, etc. are cancelled out by reference setting bias resistors $R_5$ and $R_6$.

When $V_{turns}$ rises above $BP_1$, this voltage is impressed upon point 8 through resistor $R_{10}$ which at that time will have no voltage drop across it because of the high input impedance of amplifier A2 and A3 and the fact that the voltage at point 8 is being held at $BP_1$. When $V_{turns}$ exceeds $BP_1$ at point 8, amplifier A2 "turns off" and $CR_1$ becomes non-conductive. Consequently, the voltage at points 15 and 9 varies with $V_{turns}$ as there is no voltage drop across $R_{10}$ due to the high input impedance of A2 and A3 and the non-conductive state of $CR_1$. With the voltage at point 9 varying with $V_{turns}$, but with the voltages at points 13 and 14 being held constant at $BP_2$ and $BP_3$, $R_2$ is effectively placed in parallel with $R_x$. This changes the gain of A8. This is necessary because a new constant proportional to 2K, as in the second term of equation 11, must be used as a multiplier of $V_{turns}$ to account for the new diameter of the second layer. With $R_2$ (or $R_3$ or $R_4$) being fixed and identical in value $R_x$ is merely adjusted to satisfy the ratio $R2/Rx = D1/2K$ (where $2K = 2DWE$). This implements the correct amount of gain change required for the resulting diameter increase on the new layer due to wire size (2DWE). Operation of the third and fourth, etc. layer input means is similar.

Referring to FIG. 5, stress transducer 15 produces an analogue stress signal at 11 proportional to the weight suspended from the traveling block or the load on the wire in other applications. An isolation difference amplifier A10 is connected as a voltage follower of near unity gain such that the analog stress signal at 11 is approximately equal to the output stress signal at 12. A stress compensation amplifier A11 with gain set by stress compensation gain resistors $R_{10}$ and $R_{11}$ converts the output stress signal at 12 to a stretch compensation signal at 13. Stretch compensation signal 13 is a varying negative voltage resulting in a varying current being drawn out of summing junction 14 through $R_{12}$. The result is that wrap signal 3 is altered from the apparent position of the load which would be indicated in the absence of the compensation signal. The resultant output display in the presence of the compensation signal is an indication of the actual position of the load taking into account varying amounts of stretch in the wire depending upon the weight of the load.

Figure 3:
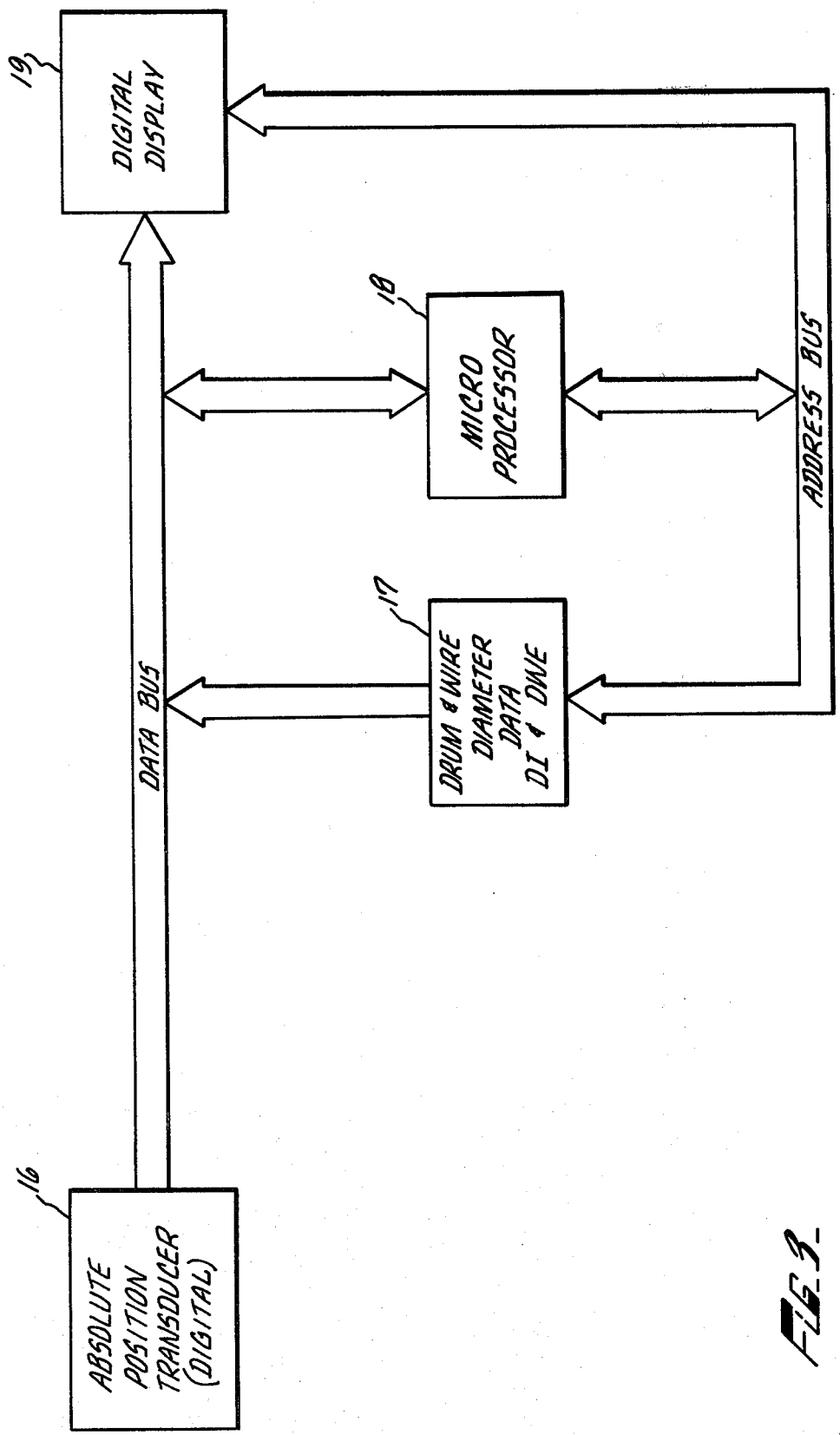
FIG. 3 is a block diagram of second embodiment of the invention using digital components.

In FIG. 3, a digital embodiment of the invention is shown. In this embodiment, the drum motion transducer 16 produces digital data indicating the absolute angular drum position. A drum and wire diameter data means 17 is used to store digital data on drum dimensions, wire size, and DWE. From the data presented from these two sources processor 18 can be programmed to compute breakpoint data, diameters of various layers, length of wire wrapped onto the drum, and the actual position of the load for display on digital display 19.

The micro processor 18 may be programed by conventional techniques to store transducer signals as they vary with the changing position of the traveling block during a calibration of the traveling block position. The micro processor 18 may also be programed by such techniques to compare the actual transucer signal with the transducer signal stored within the micro processor 18 following calibration in order to produce a corresponding traveling block position.

Figure 4:
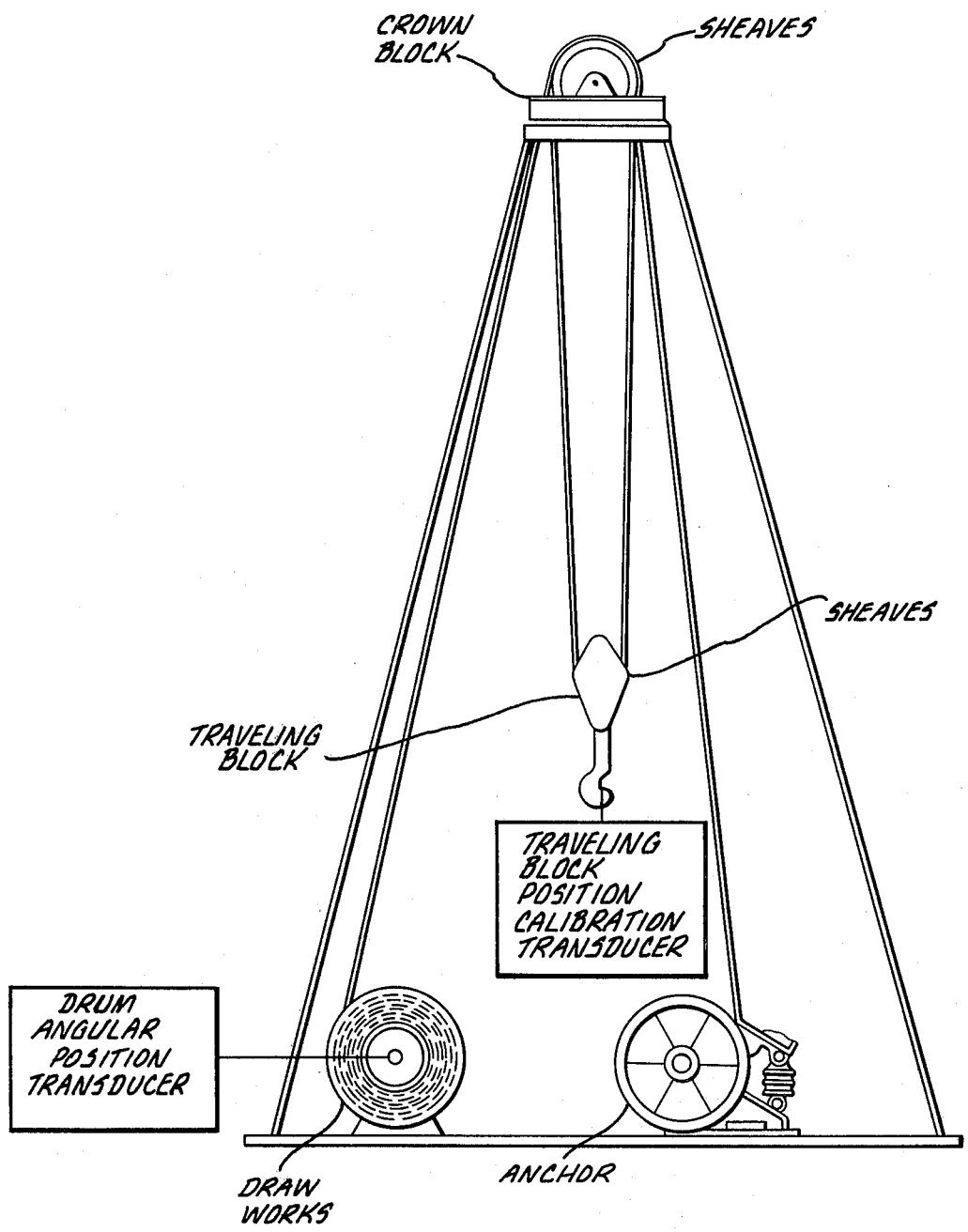
FIG. 4 is a perspective view of a winch drum traveling block arrangement typically used for hoisting drill pipe out of a hole, showing the relative location of the traveling block.

Although the invention has been described in terms of winch drum applications for oil well traveling block hoists as depicted in FIG. 4, it is not limited to these applications. Other embodiments wherein no traveling block or sheaves are present and where wire is being unwrapped from the winch drum are intended to be included.

Other specific applications for this invention are in cranes, anchor line monitors, and as a position or end of line monitor for any winch drum.

What is claimed is:

1. An improved wire length measurement apparatus for converting absolute angular position data of a drum motion transducer for a drum wrapped with multiple nested layers of coplanar, substantially round and multi-turn wire into an output indication of the position of a traveling block attached to the wire, wherein the output indication is accurate independent of the number of layers of wire, the drum diameter and the diameter of the wire, said apparatus comprising:

(a) summing amplifier means for converting an input signal representing the absolute angular drum position to a wrap signal representing the length (L) of wire wound onto the drum;
  (b) a first layer input means for applying an input signal to said summing amplifier representing the number of turns wound onto the first of said nested layers and for setting the gain of said summing amplifier such that said wrap signal represents the length of wire wrapped onto the drum;
  (c) an isolation means, connected between the output of said drum motion transducer and the input of said first layer input means, for isolating said drum motion transducer and for producing a turns signal proportional to the output signal of said drum motion transducer and representing the absolute angular position of the drum relative to its position at a given initial setting;
  (d) a second layer input means connected in parallel to the first layer input means for varying the gain of said summing amplifier such that when wire has been wrapped onto the second layer, the wrap signal of said summing amplifier represents the amount of wire wrapped onto both the first and second layers;
  (e) an additional layer input means for each additional layer of wire to be wrapped for the same purposes as the second layer input means;
  (f) a layer activation means connected to the inputs of said second and additional layer input means for activating said second and additional layer input means, thereby changing the gain of said summing amplifier, when the turns signal of said isolation means, representing the absolute angular drum position, indicates that wire is being wrapped onto the second and additional layers seriatem; and
  (g) an output means connected between the output of said summing amplifier and the input of an output display for converting the wrap signal of said summing amplifier to an output signal in convenient engineering units for display.

2. An apparatus for measuring the amount of wire wound about a drum in the form of a multilayer, multi-turn coil, comprising:

a drum motion detector for providing a signal representing the angular position of the drum with respect to a reference position;
  multiplication means for multiplying the output signal of the drum motion detector by a predetermined constant and providing as an output a wrap signal representing the length of wire wrapped onto the drum, wherein the multiplication means includes a summing amplifier having an input resistance which receives the signal from the drum motion detector; and
  first modification means for detecting when each new coil layer is being wrapped onto the drum and changing the value of said predetermined constant to compensate for an increase in the diameter of the turns of the coil for each new layer, thereby increasing the accuracy of the wrap signal, wherein the first modification means includes a plurality of resistances which may be selectively connected in parallel with the input resistance to thereby vary the gain of the summing amplifier.

3. An apparatus for determining the position of an article connected to a wire wound about a drum in the form of a multilayer, multiturn coil, comprising:
   a drum motion detector for providing a signal representing the angular position of the drum with respect to a reference position;
   multiplication means for multiplying the output signal of the drum motion detector by a predetermined constant and providing as an output a wrap signal representing the length of wire wrapped onto the drum, wherein the multiplication means includes a summing amplifier having an input resistance which receives the signal from the drum motion detector;
   first modification means for detecting when each new coil layer is being wrapped on to the drum and changing the value of said predetermined constant to compensate for an increase in the diameter of the turns of the coil for each new layer, thereby increasing the accuracy of the wrap signal, wherein the first modification means includes a plurality of resistances which may be selectively connected in parallel with the input resistance to thereby vary the gain of the summing amplifier;
   a stress detector for providing a signal representing the amount of force applied to the wire; and
   second modification means for changing the value of said predetermined constant as a function of the stress detector signal, whereby the wrap signal will correspond to the actual position of the article despite stretching of the wire, wherein the second modification means includes a stress compensation amplifier which receives the signal from the stress detector and generates a stretch compensation signal which is applied to the input of the summing amplifier.

* * * * *